3 Sheets--Sheet 1.

J. H. SILVERS, T. C. PEARCE & S. CAMMADE.

Machines for Making Tags.

No. 5,738

Reissued Jan. 20, 1874.

WITNESSES:
P. C. Dieterich.
P. Kueseckes.

INVENTOR.
John H. Silvers
Thomas C. Pearce
Samuel Cammade
per C. H. Watson & Co
ATTORNEYS.

3 Sheets--Sheet 2.

J. H. SILVERS, T. C. PEARCE & S. CAMMADE.

Machines for Making Tags.

No. 5,738. Reissued Jan. 20, 1874.

WITNESSES:
P. C. Dieterich
F. Fiesecker

INVENTOR
John H. Silvers
Thomas C. Pearce
Samuel Cammade
per C. H. Watson & Co
ATTORNEYS.

3 Sheets--Sheet 3.

J. H. SILVERS, T. C. PEARCE & S. CAMMADE.

Machines for Making Tags.

No. 5,738. Reissued Jan. 20, 1874.

WITNESSES:
P. C. Dieterich
P. Riesecker

INVENTOR,
John H. Silvers
Thomas C. Pearce
Samuel Cammade
per C. H. Wilson & Co.
ATTORNEYS.

UNITED STATES PATENT OFFICE.

JOHN H. SILVERS, THOMAS C. PEARCE, AND SAMUEL CAMMADE, ASSIGNEES OF CLARK S. HUTCHINSON, OF HIGHTSTOWN, NEW JERSEY.

IMPROVEMENT IN MACHINES FOR MAKING TAGS.

Specification forming part of Letters Patent No. 87,261, dated February 23, 1869; reissue No. 5,738, dated January 20, 1874; application filed October 6, 1873.

*To all whom it may concern:*

Be it known that CLARK S. HUTCHINSON, of Burlington, in the State of New Jersey, did invent a Machine for Making Tags and Labels; and we do hereby declare the following to be a full, clear, and exact description thereof, reference being had to the accompanying drawings, and to the letters of reference marked thereon.

The nature of this construction consists in constructing a machine which will make tags or labels from one continuous ribbon of paper; it also consists in making a tag from a continuous strip or ribbon of paper, which will be hereinafter more fully set forth.

The machine folds over the edge of paper required for the tag, inserts a tape, strips of fiber or cord, or both tape and cord at the same time, gums the fold down upon the tapes, punches the eyelet, prints the address, and cuts the tag the required width, in one continuous operation.

To enable others skilled in the art to make and use the invention, we will now proceed to describe its construction and operation, referring to the annexed drawings, which form a part of this specification, and in which—

Figure 1:
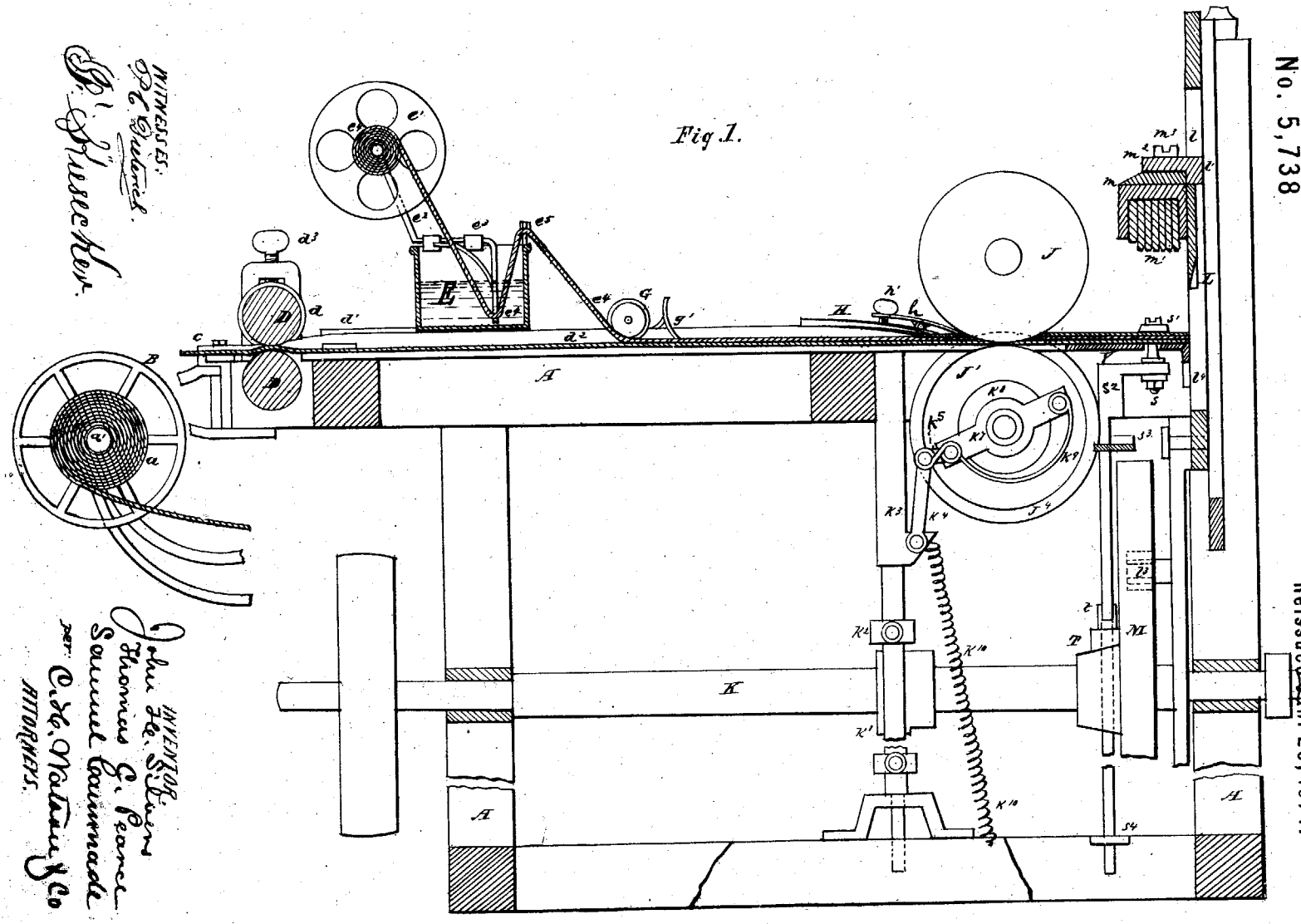
Figure 2:
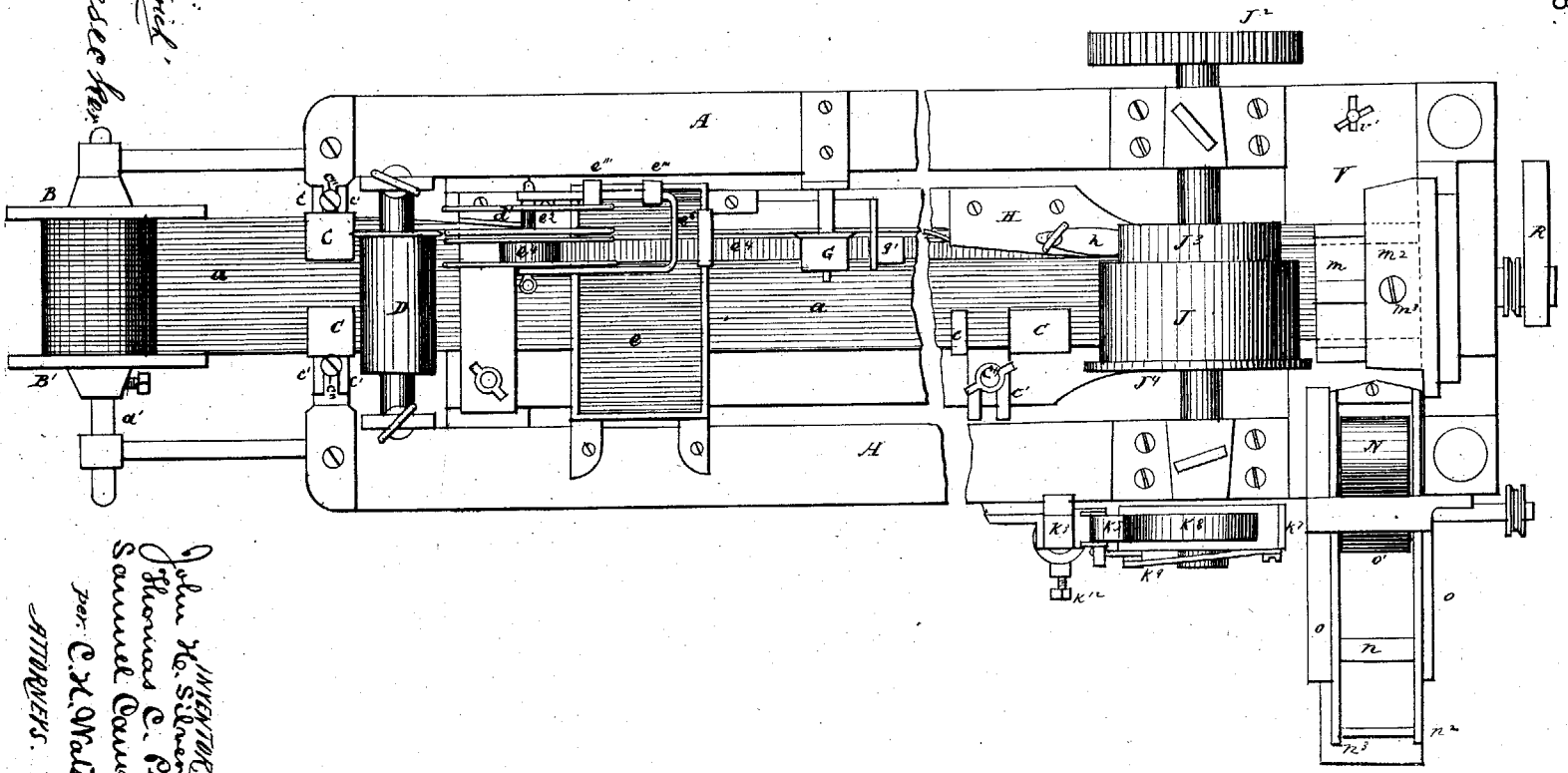
Figures 3, 4:
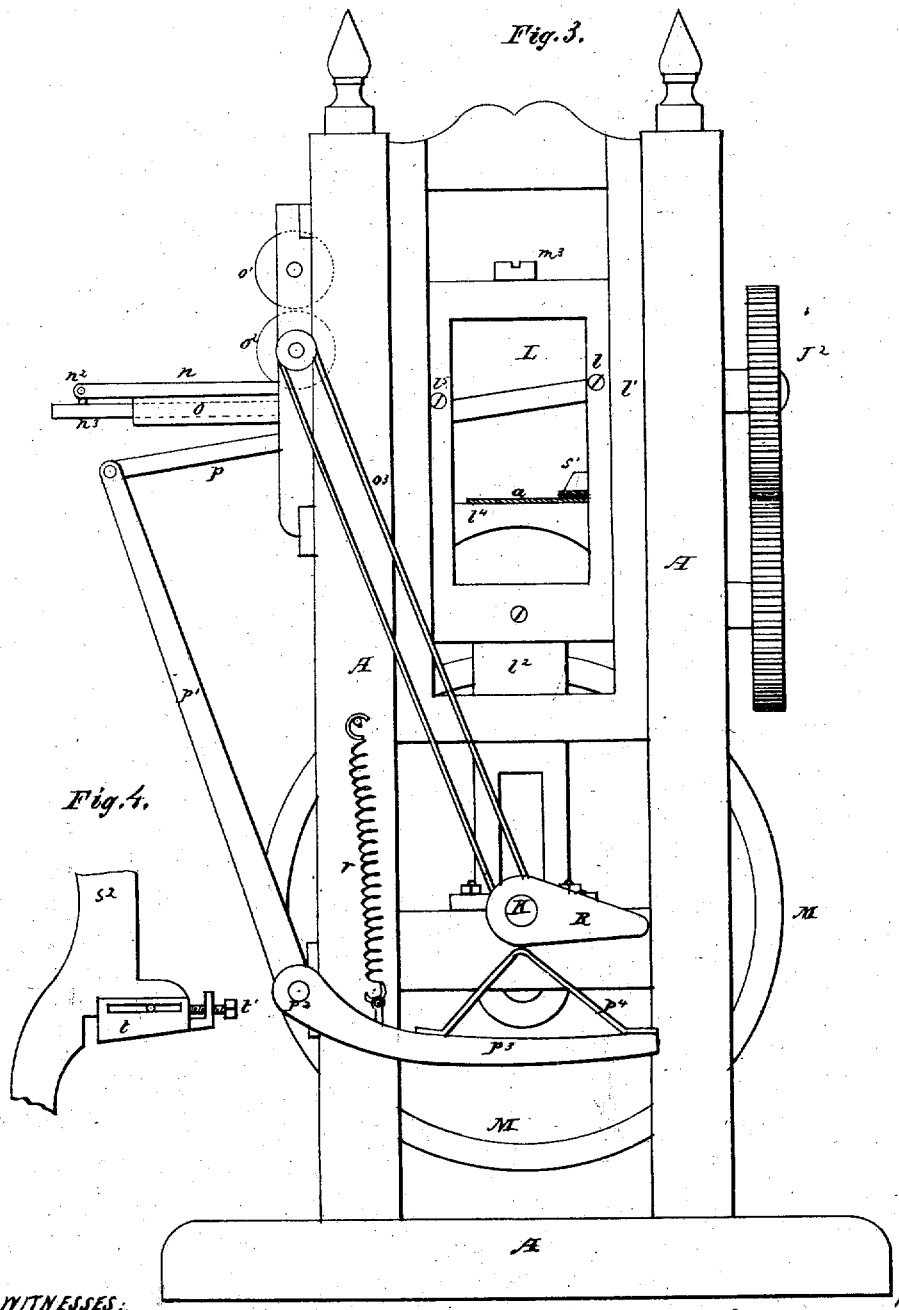

Figure 1 is an elevation, mostly in section. Fig. 2 is a plan. Fig. 3 is an end view. Fig. 4 is the sliding wedge detached.

A is the frame of the machine; B B′, the reel, on which is wound the ribbon of paper *a*. The side plate $B^1$ is movable endwise on spindle $a^1$ to accommodate the width of paper required for the tags. C is a guide for giving direction to the paper; D D, a pair of rollers, the upper one having a flange, *d*, fitting into a corresponding groove in the lower roller. This flange and groove crease the paper in the proper line at which it is to be bent, and the upper roller, being shorter than the lower one, permits the flanged edge of the paper to bend up nearly at right angles. The guide $d^1$ further assists in giving the flange $d^2$ a perpendicular direction. The rollers D may be brought into closer contact by screws $d^3$ acting on their bearings. E is a pan filled with paste or mucilage *e*. $e^1$ is a reel, carried by an arm, $e^2$, which is hinged to the pan E at $e^3$. The arm $e^2$ is continued down into the tank or pan E nearly to the bottom, at $e^6$, and slotted at the bottom for the passage of the cord or tape. The reel $e^1$ has wound on it the cord or tape $e^4$ to be inserted in the tag. $e^5$ is a plate on the side of the pan, through which tape $e^4$ passes and is scraped of surplus mucilage. The reel $e^1$ swings upon the hinge $e^3$, so that the guiding-rod $e^6$ may be lifted out of the tank for the adjustment of the tape beneath the rod $e^6$. G is a small flanged guide-roller, for giving direction to the tape $e^4$; and $g^1$ is a small bent strip of metal, pressing the tape in its place and equally distributing the mucilage. C C represent guides with an opening sufficiently wide to allow the strip of material $e^4$ to pass in them to keep said material in proper position. These guides have a slotted portion, C′, and adjustably attached to the frame A by the thumb-screw C″, to be set in or out when wide or narrow material is used. H is a strip of metal, so curved as to turn over the bent perpendicular edge of the strip of paper and fold it down flat upon the tape. The spring-bar *h* is hinged at its center, one end resting upon the fold, its pressure being regulated by an adjustable-screw, $h^1$, at the opposite end. J $J^1$ are a pair of feed-rollers, geared into each other at $J^2$. They draw the paper from the reel B and force it forward. The upper roller is adjustable in its bearing, so as to nip the ribbon or paper. It is cut away at $J^3$ to permit the extra thickness of the fold to pass through; and the under roller has a plain surface its entire length. These rollers also have flanges $J^4$ on opposite ends, to assist in keeping the material $e^4$ between the same. Motion is given to the feed-rollers in this way: K′ is the main driving-shaft of the machine, having on it a cam, $k^1$, which, in its upward motion, strikes against the arm $k^2$ and elevates the upright bar $k^3$, which slides in guides at the top and bottom. To the bar $k^3$ is hinged a link, $k^4$, and that is jointed to another small link, $k^5$, which is pivoted to the shackle $k^7$. The shackle $k^7$ embraces both sides of the wheel $k^8$, and the elevation of the link $k^4$ causes the shackle to bite on the opposite points of the wheel $k^3$, and give the requisite motion to the feed-rollers. The spring $k^9$ maintains the action of the shackle more uniform. A spring, $k^{10}$, reverses the motion of the shackle $k^7$, if the weight of the rod $k^3$ is not sufficient. The arm $k^2$ is adjustable vertically by screws $k^{12}$ to regulate the stroke. L is the knife or shears, fitting in a frame, $l$, and sliding up and down vertically in guides $l^1$. The lower end of the frame $l$ is extended into a fork, $l^2$, embracing the shaft K. This fork carries on it a stud and roller, $l^3$, which works in a groove in a cam on wheel M, thus giving motion to the knife L, which is kept in close-fitting contact with its corresponding blade $l^4$ by means of a screw, $l^5$. The lower blade $l^4$ is secured rigidly to the guide $l^1$. $m^2$ is an angle-piece cast on the frame $l$, and, by screws $m^3$, the type-box $m$ is secured to it, so that the type $m^1$ is adjustable over the exact spot on the tag. The type partakes of the same motion as the shears L. N is the inking-roller, pivoted in a frame, $n$, which is hinged, at $n^2$, to a sliding guide, $n^3$. This sliding guide runs in a groove in the frame O. This frame O carries two inking feed-rollers, $o^1$ $o^2$, for supplying ink to the roller N. They are rotated by a band, $o^3$, operated from the main shaft K. The connecting-rod $p$ is jointed to the sliding guide $n^3$ at one end; at the other to a vibrating arm, $p^1$, which is keyed on the shaft $p^2$. To the other end of the shaft $p^2$ is keyed another arm, $p^3$, and secured on this arm is a triangular tappet, $p^4$. The pointed cam R strikes this tappet, and thus gives motion to the inking-roller N. The spring $r$ gives the reverse motion to the inking-roller. S is the punch for making the holes through the end of the tag. $s^1$ is the stop, which receives the thrust of the punch. It is bolted to the plate V, which is bolted to the frame A, and is adjustable by bolts $v^1$, to suit the position of the hole to be punched. The punch S passes through a hole cut in said plate V. The punch has on it a collar and nut, and is bolted to the forked bar $s^2$. Thus it can be removed and sharpened, or its position changed to suit the width of the tag. The bar $s^2$ runs in guides $s^3$ $s^4$, at top and bottom. The upper guide, $s^3$, and the lower one, also, are adjustable by bolts, which fit into the frame A. Thus the punch S can be moved sufficiently to be placed in a central position for any size of tag required. The pressure to the punch is given, by a cam, T, upon the boss of the wheel M. This cam T strikes a sliding wedge, $t$, (see Fig. 4,) set in a proper position by a screw, $t^1$, to give the exact pressure required to perfect the hole in the tag.

The operation of the machine we will now briefly recapitulate. The ribbon of paper is wound upon a reel, B, from which it is drawn at a regular motion of the feed-rollers J. The guides C C steady it in its onward course in a direct line. The rollers D flange it and crease it. The guide $d^1$ turns the flange $d^2$ up at right angles. The reel $e^1$ has on it the tape $e^4$, or a cord also. Both, or one, or neither, can be used at option. In using the tape, carry one end down under the guide $e^6$ through the mucilage $e$, up through the scraper $e^5$, down again under roller G, then under guide $g^1$, where it is pressed down to the paper; and, as it passes forward, the flanged edge is folded down over it by the folder H, and is pressed firmly down by a spring presser-bar, $h$. It then passes between the feed-rollers J and on between the plate V and stop $s^1$, and the hole is punched. At the proper interval of time the inking-roller N passes under the type $m^1$ and recedes again. The type descends with the knife and prints the tag, and the knife L cuts off the tag, previously printed and punched, complete.

A piece of strong paper strips may be used instead of the tape, or the flanged edge may be gummed, without any tape being used; or a ribbon of paper and cloth, combined in one article, may be used instead of the paper ribbon. These would only be modifications of the same general design herein described.

It will thus be seen that tags are manufactured from a continuous strip of paper, and also made with a turned-down head.

The same machine will also make business-cards if the folding and gumming operation is omitted.

Having thus fully described the invention, what we claim as new, and desire to secure by Letters Patent, is—

1. The tag-machine herein described, for making finished tags from a continuous strip of ribbon-paper by the intermittent feed-motion, punch S, printing device $m^1$, and reciprocating knife L, and operating in combination, substantially as shown and described.

2. The creasing-rollers D, glue or paste-tank E, guide-roller G, and folder H, for folding down and pasting the ribbon-paper $a$ with fiber $e^4$, in combination with the intermittent feed-motion and punching apparatus, as and for the purpose specified.

3. The guides C C, having openings for the material $a$, slotted portion $c'$, and adjusting-screws $c''$, in combination with the reel B and creasing-rollers D, substantially as and for the purpose specified.

4. The metal strip H, curved to turn over the bent perpendicular edge of the web $a$, in combination with the spring-bar $h$ and adjusting-screw $h^1$, as and for the purpose herein set forth.

5. The roller J, adjustable in its bearings, flanged at one end and cut away at $J^3$, in combination with the roller $J^1$, having plane surface and flanged on the opposite end from the flange on roller J, all constructed substantially as and for the purpose herein described.

6. The angle-piece $m^2$, cast on frame $l$, and screws $m^3$, in combination with the type-box $m$ and type $m^1$, to adjust the type and box over the tags, the whole having the same motion as the shears L, substantially as and for the purpose herein described.

7. In a tag-machine, the combination of the rollers D, tank E, roller G, guide H, rollers J $J^1$, punch S, knife L, and printing device, and operative mechanism for forming a complete tag from the two parts of the material $a$ and $e^4$, substantially as and for the purpose set forth.

JOHN H. SILVERS.
THOMAS C. PEARCE.
SAMUEL CAMMADE.

Witnesses:
L. M. SCHANCK,
MARY A. SCHANCK.